(12) United States Patent
Liu et al.

(10) Patent No.: US 10,936,032 B2
(45) Date of Patent: Mar. 2, 2021

(54) INFORMATION HANDLING SYSTEM DUAL CHARGER POWER BALANCING AND FAST ROLE SWAPPING

(71) Applicant: Dell Products L.P., Round Rock, TX (US)

(72) Inventors: Yung-Chun Liu, Taipei (TW); Gerald Rene Pelissier, Mendham, NJ (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 16/215,939

(22) Filed: Dec. 11, 2018

(65) Prior Publication Data

US 2020/0183471 A1 Jun. 11, 2020

(51) Int. Cl.
*G06F 1/26* (2006.01)
*G06F 13/42* (2006.01)

(52) U.S. Cl.
CPC .......... *G06F 1/263* (2013.01); *G06F 13/4282* (2013.01); *G06F 2213/0042* (2013.01)

(58) Field of Classification Search
CPC ................. G06F 1/263; G06F 13/4282; G06F 2213/0042; G06F 1/266
See application file for complete search history.

(56) References Cited

U.S. PATENT DOCUMENTS

| | | | |
|---|---|---|---|
| 7,852,974 B2 | 12/2010 | Whetsel | |
| 9,515,419 B2 * | 12/2016 | Inskeep | H05B 45/00 |
| 10,097,017 B2 * | 10/2018 | Greening | H02M 1/10 |
| 10,333,323 B2 * | 6/2019 | Arends | H02J 7/342 |
| 10,642,333 B2 * | 5/2020 | Krishnakumar | G06F 1/3212 |
| 2007/0106913 A1 * | 5/2007 | Lewis | G06F 1/26 713/300 |
| 2011/0006603 A1 * | 1/2011 | Robinson | H02J 7/0021 307/31 |
| 2012/0151240 A1 * | 6/2012 | Robinson | H02J 5/00 713/340 |
| 2014/0203761 A1 * | 7/2014 | Paparrizos | H02J 7/022 320/107 |
| 2014/0208134 A1 | 7/2014 | Waters et al. | |
| 2015/0214770 A1 * | 7/2015 | Chen | H02J 7/02 307/19 |
| 2016/0277235 A1 | 9/2016 | Bhesania et al. | |
| 2017/0089958 A1 * | 3/2017 | Guntreddi | H02M 3/156 |
| 2017/0279284 A1 * | 9/2017 | Lim | H02J 7/0024 |
| 2017/0293335 A1 * | 10/2017 | Dunstan | G06F 13/4282 |
| 2017/0317583 A1 | 11/2017 | Forghani-Zadeh et al. | |

(Continued)

*Primary Examiner* — Nha T Nguyen
(74) *Attorney, Agent, or Firm* — Zagorin Cave LLP; Robert W. Holland

(57) ABSTRACT

An information handling system port, such as a USB Type C port, interfaces through a switch with first and second chargers that support bi-directional power transfer. A controller selectively configures one charger to accept power from the port and the other charger to discharge power to the port, the controller commanding the switch to interface a selected charger based upon whether a power source or power sink interfaces with the port. First and second batteries interface with the first and second chargers and a power rail through a second switch. The controller selectively interfaces and disconnects the batteries with the power rail to simultaneously support discharge to the power rail and to the port.

17 Claims, 14 Drawing Sheets

(56) References Cited

U.S. PATENT DOCUMENTS

| | | | |
|---|---|---|---|
| 2018/0076647 A1* | 3/2018 | Wei | H02M 3/1582 |
| 2018/0278080 A1* | 9/2018 | Matoba | H02J 7/0071 |
| 2018/0341310 A1* | 11/2018 | Lambert | G06F 13/4282 |
| 2019/0074698 A1* | 3/2019 | Singhal | H02J 7/342 |
| 2019/0081487 A1* | 3/2019 | Baby | H02J 7/0016 |
| 2019/0115833 A1* | 4/2019 | Belet | H02J 7/0068 |
| 2019/0140456 A1* | 5/2019 | Hsu | H02J 7/007 |
| 2020/0091758 A1* | 3/2020 | Jahan | H02J 7/00 |

* cited by examiner

INFORMATION HANDLING SYSTEM DUAL CHARGER POWER BALANCING AND FAST ROLE SWAPPING

BACKGROUND OF THE INVENTION

Field of the Invention

The present invention relates in general to the field of information handling system power management, and more particularly to information handling system dual charger power balancing and fast role swapping.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally process information with both an external and an internal power source. The external power source typically accepts alternating current at an external AC-to-DC converter that converts power to defined direct current constraints. The internal power source is typically a lithium ion battery pack having plural lithium ion battery cells interfaced in parallel and series to supply defined current and voltage constraints. Generally, when external power is coupled to portable information handling system, the external power is first directed towards powering processing components with excess external power then directed towards charging the internal power source.

Power management at portable information handling systems has grown complex as portable information handling system designs have sought to balance competing goals of powerful processing capability and extended battery life. Generally, processing capability depends upon direct current power dissipation through integrated circuits at defined voltages. During time periods of minimal use or inactivity, modern processors tend to reduce power consumption with a variety of techniques, including reducing the processor clock speed. During periods of intense computations, such as during execution of complex applications like computer assisted drawing, modern processors rapidly increase power consumption to perform calculations quickly, such as by entering a "turbo" mode of operations having an increased clock speed. During shifts from low to high power consumption, rapid changes in current draw may take place that test power supply limits. For example, too rapid of an increase in current draw at a processor can cause a voltage droop below processor voltage constraints. One solution that helps ensure adequate current draw within voltage constraints is to dynamically discharge current from the internal power supply so that both the external and internal power supplies are available to meet current demand.

To help ensure adequate current supply across anticipated operating conditions, portable information handling systems often have external power supplies specified to exceed maximum system current demand. In some instances, standardized external power supplies will meet maximum current demand by supplementing power during high consumption operations with internal battery power. One example of a standardized external power supply is the Universal Serial Bus Power Delivery 3.0 as embodied through a Type C connector. USB Type C connectors and ports can exchange as much as 100 W in a bi-directional manner at between 5 and 20 VDC. Smaller portable information handling systems, such as tablets and smartphones, can typically meet operational power demands with a USB Type C interface, especially if internal battery power is made available for consumption during periods of heavy current draw. Although larger portable information handling systems generally include USB ports for communication that also transfer power, such as Type C ports, power transfer of USB ports is typically insufficient to meet operational needs. Power draw by larger portable information handling systems typically exceed USB Type C power supply capabilities, although a Type C interface can provide partial power needs of such portable information handling systems, such as by charging a battery as the battery supplies the information handling system or combining multiple external power sources to achieve operational power demands.

One difficulty that can arise with USB PD 3.0 is that bi-direction power transfer can rapidly alter power distribution through a portable information handling system as external power sources are connected and disconnected at an information handling system. For example, a portable information handling system with or without external power connected may have a power request at a USB Type C port to provide external power to an external device. USB PD 3.0 defines a Fast Role Swap (FRS) capability that addresses timing constraints for changing power transfer roles. For instance, an FRS compliant USB port has to switch from sinking power to sourcing power quickly enough to avoid interruption of power, such as a hardware response of under 150 microseconds. The fast response may involve a complex scenario having 20 VDC and 100 W of power at the USB port while the information handling system itself rapidly adjusts to varying system power demands, such as shifts into and out of turbo mode.

SUMMARY OF THE INVENTION

Therefore, a need has arisen for a system and method which manages power balance in a dual charger configuration.

In accordance with the present invention, a system and method are provided which substantially reduce the disadvantages and problems associated with previous methods and systems for managing power distribution at a portable information handling system. Plural chargers interface with a bi-directional power transfer port through a switch and configure separately to accept or provide power at the port based upon an interface with an external power source or sink at the port. Each charger supports a battery, each battery interfaced with a switch to a power rail of the information handling system to cut off power to the power rail by the battery if the battery's associated charger discharges power to the port.

More specifically, an information handling system processes information with a processor and memory that operate on direct current power provided from internal and external power sources. External power enters a power system from an external power source through a port and is directed to one or both of two chargers by a switch, such as multiplexer, based upon one or more predetermined conditions. A fast response time for converting the port to support a power sink when a power source disconnects from the port is provided by configuring one charger to accept power and the other to provide power. When a power source disconnects from the port, the switch rapidly converts the port to output power by changing which charger interfaces with the port. Each charger interfaces with a battery to provide power to a power rail or to the port for providing power from the port. The batteries interface with the power rail through a second switch that selectively disconnects one of the batteries from the power rail to support output of power at the port when a power sink interfaces with the port. A controller configures the chargers and switches to manage power distribution, battery charge balance and battery discharge based upon sensed power conditions.

The present invention provides a number of important technical advantages. One example of an important technical advantage is that a portable information handling system rapidly adapts to power availability, power consumption and power transfer conditions to manage system power distribution. Dual chargers that each manage a separate battery have charge and discharge configurations adjusted by an embedded controller to support concurrent battery charging and battery charge balancing, such as by managing distribution of charge to each charger based upon battery charge state. Predictive fast role swapping is supported with separate charger configurations that allow rapid embedded controller management of charger output to a desired sink. Dual chargers with separate input and output management reduces complexity and cost of power rail analog circuits that support power role swapping while improving response time and flexibility to changing power conditions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system power system supports fast response transition between a power source and sink at a port with plural chargers and batteries managed through plural switches. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
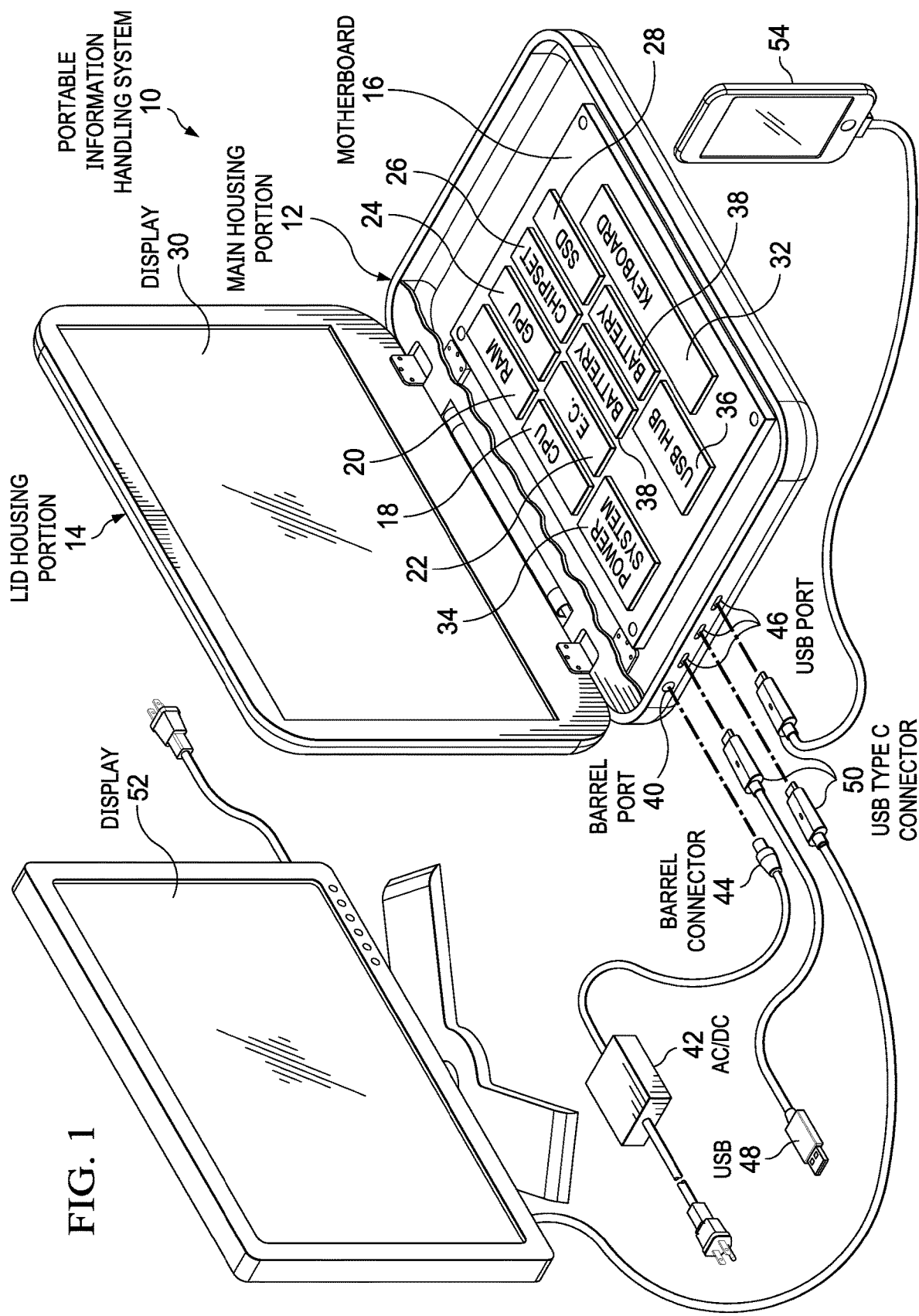
FIG. 1 depicts a block diagram of an information handling system having plural chargers selectively configured to support fast response on transition from a power source to a power sink at a port.

Referring now to FIG. 1, a block diagram depicts an information handling system 10 having plural chargers selectively configured to support fast response on transition from a power source to a power sink at a port. In the example embodiment, information handling system 10 has a portable convertible configuration with a main housing portion 12 rotationally coupled to a lid housing portion 14 to rotate between closed, clamshell and tablet configurations. In alternative embodiments, information handling system 10 may have a tablet, desktop or other type of configuration. Main housing portion 12 contains processing components that cooperate to process information. For instance, a motherboard 16 interfaces a central processing unit (CPU) 18 with random access memory (RAM) 20 to execute instructions that process information stored in RAM 20. An embedded controller 22 manages power to the processing components and input/output (I/O) devices that communicate with CPU 18, such as keyed inputs or mouse inputs. A graphics processor unit (GPU) 24 processes the information to generate visual information for presentation at display 30, such as by generating pixel values that define a visual image. A chipset 26 manages interactions with CPU 18, such as memory access, graphics access, and clock speed. A solid state drive (SSD) 28 provides persistent storage for an operating system and applications that execute on CPU 18. For instance, at initial application of power, pre-boot code executes on embedded controller 22 to retrieve an operating system, such as WINDOWS, to CPU 18 and RAM 20 for supporting execution of applications. A keyboard 32 fits over the processing components to accept end user inputs when lid housing portion 14 rotates to the open position. In one alternative embodiment, information handling system 10 separates main housing portion 12 and lid housing portion 14 into two separate pieces, such as having a tablet portion that includes the processing components and a first battery that removeably couples to a keyboard base having a second battery.

In the example embodiment, a power system 34 manages power provided to and from external devices and at plural internal batteries 38. For instance, a USB hub 36 interfaces plural USB ports 46 with power system 34, such as USB Type C ports compliant with the USB PD 3.0 standard. Power system 34 supports bi-directional power transfer at USB ports 46, meaning that power provided to a port 46 from an external device to power system 34 operates the processing components and charges batteries 38, yet power system 34 can also provide power to ports 46 that powers external devices. In the example embodiment, a barrel power port 40 also provides external power to power system 34 from an external AC/DC converter 42 that terminates in barrel connector 44. External power through barrel port 40 may be designed to meet or exceed maximum power consumption designed for information handling system 10, and may support power transfer out of USB ports 46 as needed. In contrast, a USB power supply 48 compliant with PD 3.0 generally is limited to 100 W of power transfer, which may be less than the maximum designed power consumption of information handling system 10. In various embodiments, power may be supplied to information handling system 10 through only a single USB port 46, through plural USB ports 46 or through a combination of USB ports 46 and barrel port 40. For example, USB hub 36 may be an external peripheral device that supports multiple peripheral device interfaces with a single USB port 46 of information handling system 10.

In the example embodiment, information handling system 10 interfaces ports 46 with connectors 50 that provide communication and power transfer with peripheral devices, such as peripheral display 52 and a smartphone information handling system 54 having USB Type C ports and connectors. Bi-directional power transfer allows information handling system 10 to accept power from a USB power supply 48 or a peripheral display 52 while simultaneously providing power to smartphone 54. A difficulty that can arise during bi-direction power transfer is that a power source can disconnect from one port 46 while another port 46 is providing power to another external device. Power system 34 provides a fast response that initiates power transfer to the external sink from an internal battery or barrel port 40 before the external device fails from power starvation. Power source 34 accomplishes the fast response in part by preconfiguring a charger to provide power and connecting the preconfigured charger in a rapid manner upon detection of the loss of the power source. The fast response power system 34 provides additional advantages in managing power distribution and balance across internal power sources.

Figure 2:
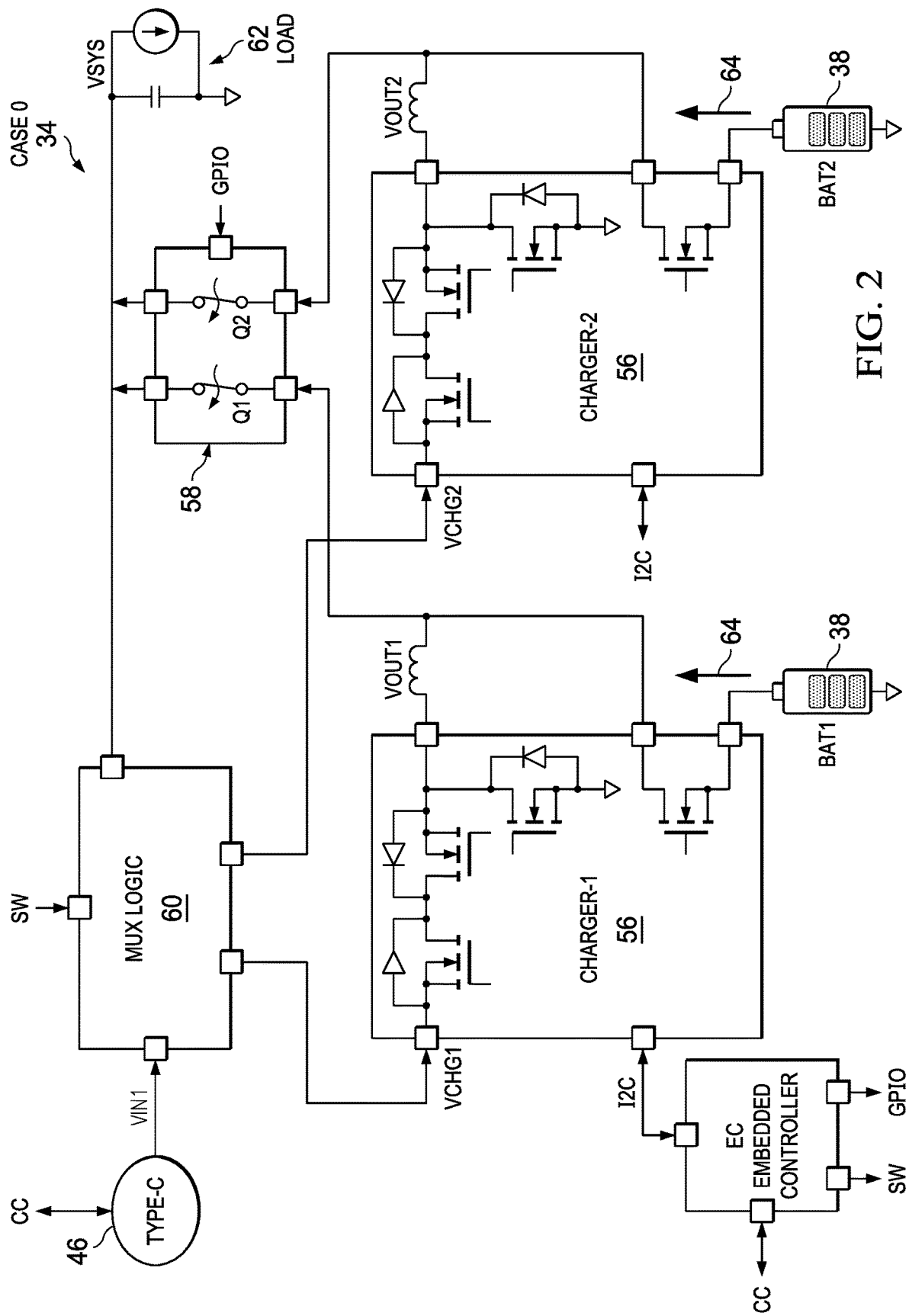
FIG. 2 depicts a circuit block diagram of a power system having multiple chargers configured to provide power from multiple batteries to a power rail.

Referring now to FIG. 2, a circuit block diagram depicts a power system 34 having multiple chargers 56 configured to provide power from multiple batteries 38 to a power rail Vsys that powers a load 62, such as processing components of an information handling system 10. In the example embodiment, a single USB Type C port 46 provides bi-directional power transfer capability but is not populated by a connector. An embedded controller 22 executes firmware instructions that manage operation of two separate chargers 56, such as instructions stored in non-transitory flash memory integrated in or interfaced with embedded controller 22. As configured in FIG. 2, no external power is provided from or to port 46 so that batteries 38 power load 62 through Vsys as indicated by arrows 64. Power from batteries 38 proceed through chargers 36 and a battery switch 58 having switching element Q1 to control output from the battery 38 of charger 1 and Q2 to control the output from battery 38 of charger 2. A GPIO input to battery switch 58 controls Q1 and Q2 with commands from embedded controller 22. As depicted without power input or output at port 46, both Q1 and Q2 are closed to allow discharge from both batteries 38.

Figure 3:
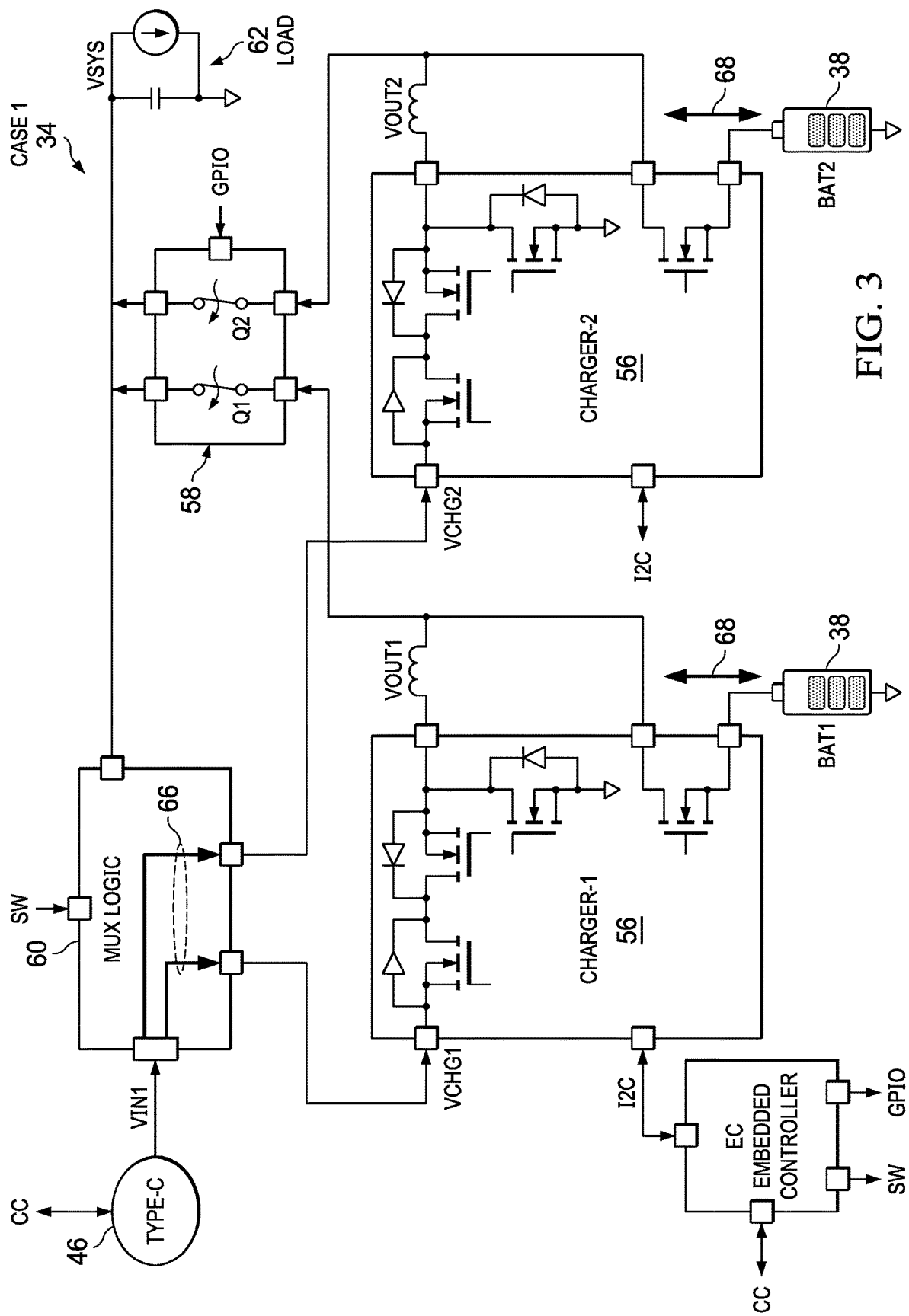
FIG. 3 depicts the circuit block diagram having the chargers configured to accept external power from the port.

Referring now to FIG. 3, the circuit block diagram depicts the chargers 56 configured to accept external power from port 46. As illustrated, port 46 includes control lines CC that interface with embedded controller 22 to configure chargers 56, such as according to the USB PD 3.0 standard. Embedded controller 22 in turn configures chargers 56 through an I2C interface based upon the power transfer configuration exchanged through port 46. As indicated by arrows 66 with only a power source interfaced at port 46, both batteries 38 charge and discharge based upon the configuration provided to chargers 56. As indicated by arrows 66, switch 60 interfaces power from port 46 with the Vchg input at both chargers 56 based upon a command sent from embedded controller 22 through a control interface labeled SW. For example, at an initial interface with port 46 a power source communicates power transfer configuration information through the CC control lines with embedded controller 22. Embedded controller 22 applies the power configuration information transferred with the power source to determine power transfer settings for both chargers 56, such as by assigning one-half of available power transfer to each charger 56 through the I2C interface with each charger 56. Embedded controller 56 sends a command through the SW interface to switch 60 so that Vin of port 46 interfaces with the Vchg of both chargers 56. In the example embodiment, switch 60 is a multiplexer that selectively interfaces port 46 Vin with one or both of chargers 56. In addition, embedded controller 22 interfaces through a GPIO with switch 58 to interface both batteries 38 with the power rail Vsys.

In the example embodiment as configured in FIG. 3, power provided through port 46 by an external source routes to both chargers 56. Each charger 56 is configured by embedded controller 22 so that in total power draw of chargers 56 do not exceed that available from the external power sources. For instance, each charger 56 is assigned one-half of the available power, which each charger 56 in turn makes available through Vout to power rail Vsys through switch 58. Alternatively, embedded controller 22 may adjust the power load assigned to each charger 56 so that one charger handles the majority of power transfer while the other remains inactive or handles a smaller portion of the power transfer. In addition, each charger 56 has charge and discharge characteristics assigned to manage the charge state of batteries 38. For instance, in some cases external power from port 46 may be supplemented by a discharge from one or both batteries 38 where system power draw at Vsys exceeds the power available from the external power source. By having both chargers 56 and both batteries 38 available to meet power demands of power rail Vsys, a more rapid and precise control may be realized. Further, in various embodiments, improved power efficiencies may be realized by adjusting charge and discharge settings at each charger 56.

Figure 4:
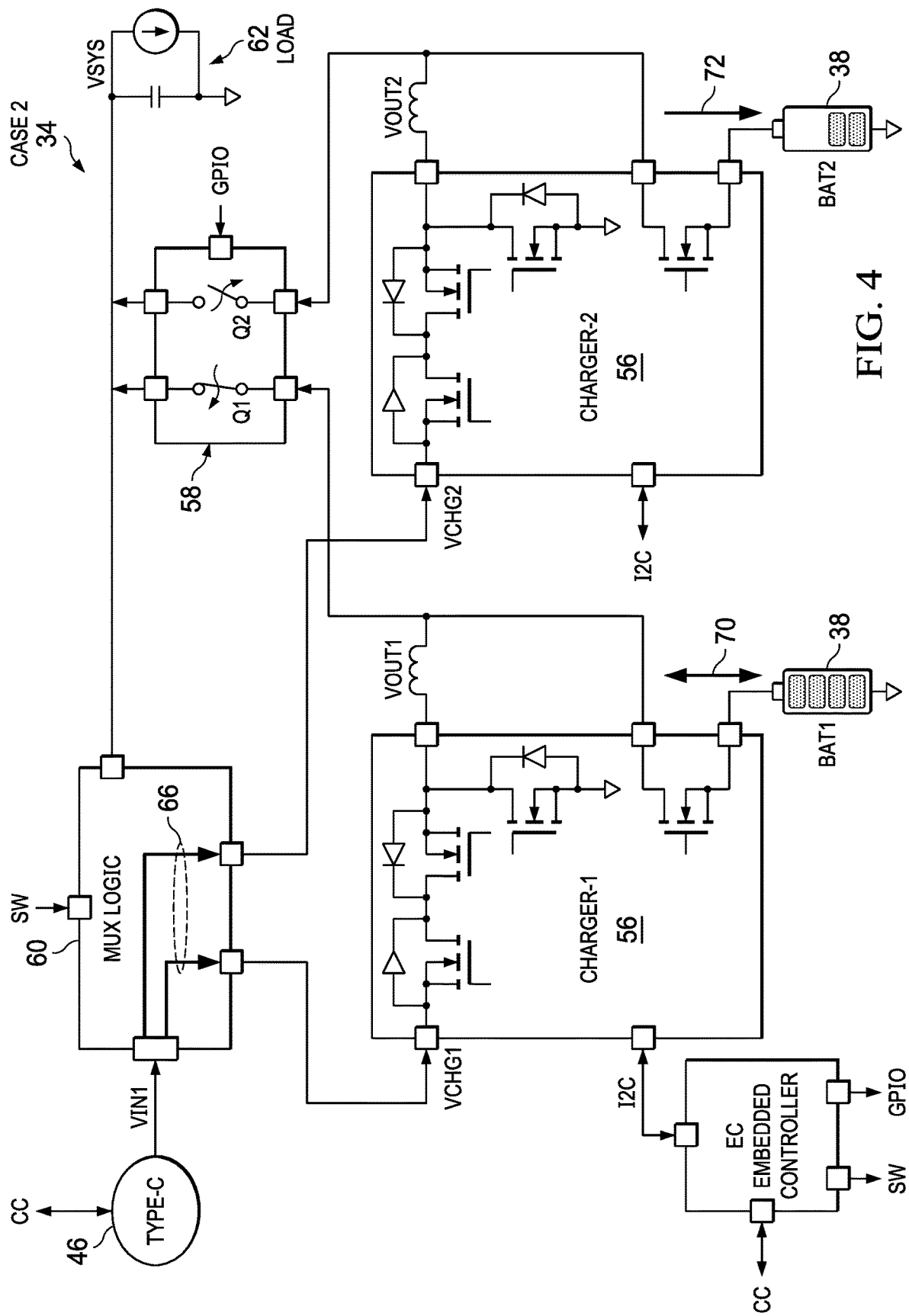
FIG. 4 depicts the circuit block diagram having the chargers configured to accept external power from the port and balance charge at plural batteries.
Figure 5:
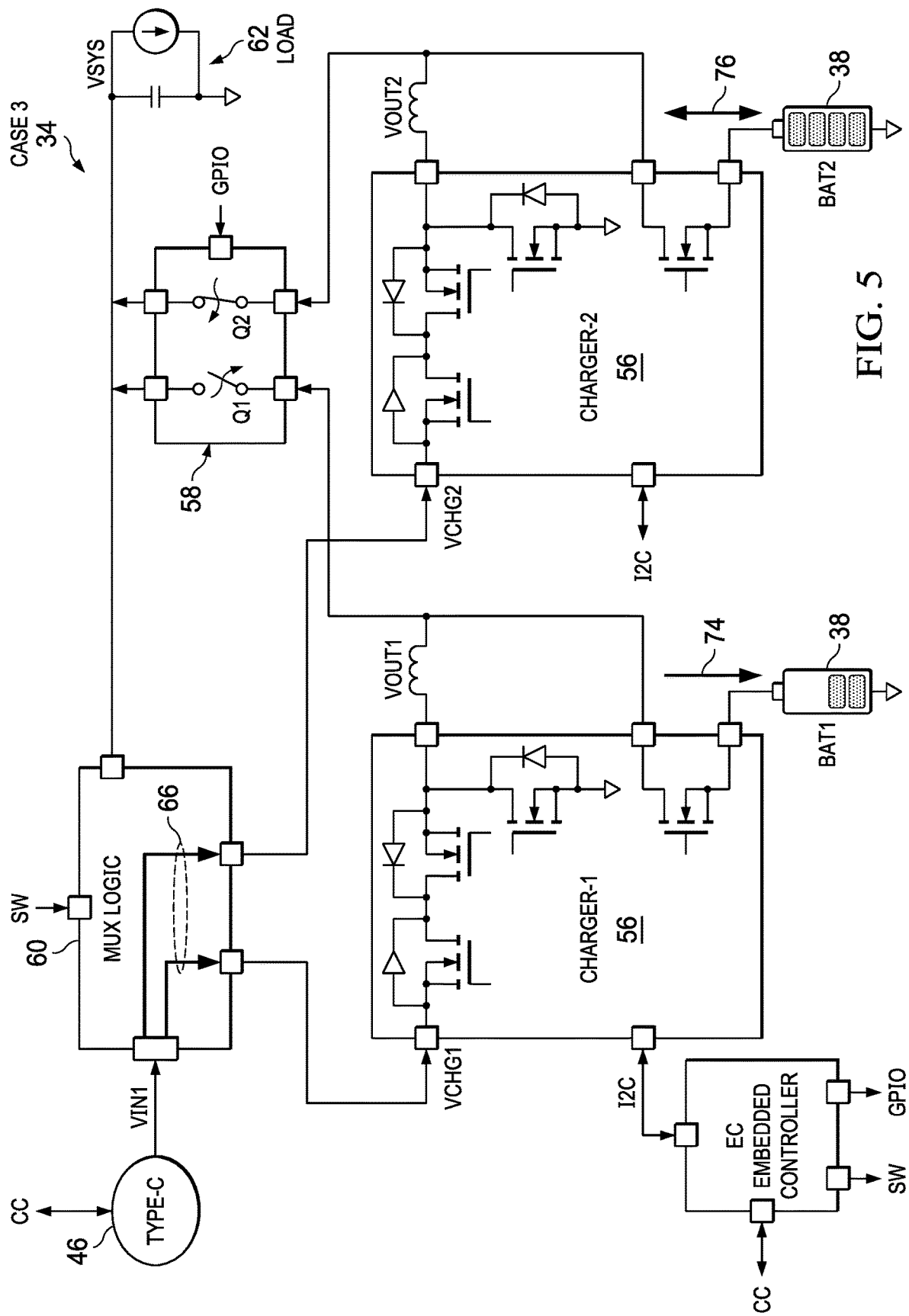
FIG. 5 depicts the circuit block diagram having the chargers configured to accept external power from the port and balance charge at plural batteries.

Referring now to FIG. 4, the circuit block diagram depicts the chargers 56 configured to accept external power from the port 46 and balance charge at plural batteries 38. In the example embodiment, port 46 interfaces with both chargers 56 through switch 60 as indicated by arrows 66. Battery 38 interfaced with charger 56 labeled charger-1 has a full charge while battery 38 interfaced with charger 56 labeled charger-2 has a depleted charge. Such an imbalance might occur, for instance, where a tablet housing portion that includes battery 38 labeled Bat2 has operated separately from a main housing portion that includes battery 38 labeled Bat1. To balance the charge state of the two batteries 38, embedded controller 22 commands switch 58 to disconnect Bat2 from power rail Vsys by opening switch Q2. In that configuration, charger-1 and Bat1 provided power to power rail Vsys while charger-2 receives power through Vchg2 that is dedicated to charging Bat2, as indicated by arrow 72. As depicted by FIG. 5, an inverse of the configuration at switch 58 that opens Q1 and closes Q2 provides dedicated charging at Bat1 with charger-1 as indicated by arrow 74 while power rail Vsys is powered by charger-2 through Q2.

Battery charge balancing as depicted by FIGS. 4 and 5 may be supported with a variety of power transfer configurations defined by embedded controller 22. For example, embedded controller 22 may assign each charger 56 with different proportions of power available from port 46 based upon a context detected at information handling system 10. During periods of inactivity, a greater portion of power may be directed to a dedicated battery charging operation than during periods of user activity or increase power draw by load 62. The division of power between chargers 56 may also vary based upon the amount of power available from a battery 38 to dynamically discharge to power rails Vsys, as indicated by the bi-directional arrows 70 and 76. For example, if a battery 38 supports a dynamic discharge sufficient to support anticipated bursts of system power demand, a greater proportion of available power from port 46 may be dedicated to battery charge. As another example, in a sleep mode where load 62 is minimal, the majority of power from port 46 may be directed towards charging a battery 38. In such a configuration, embedded controller 22 readjusts power distribution a system wake.

Figure 6:
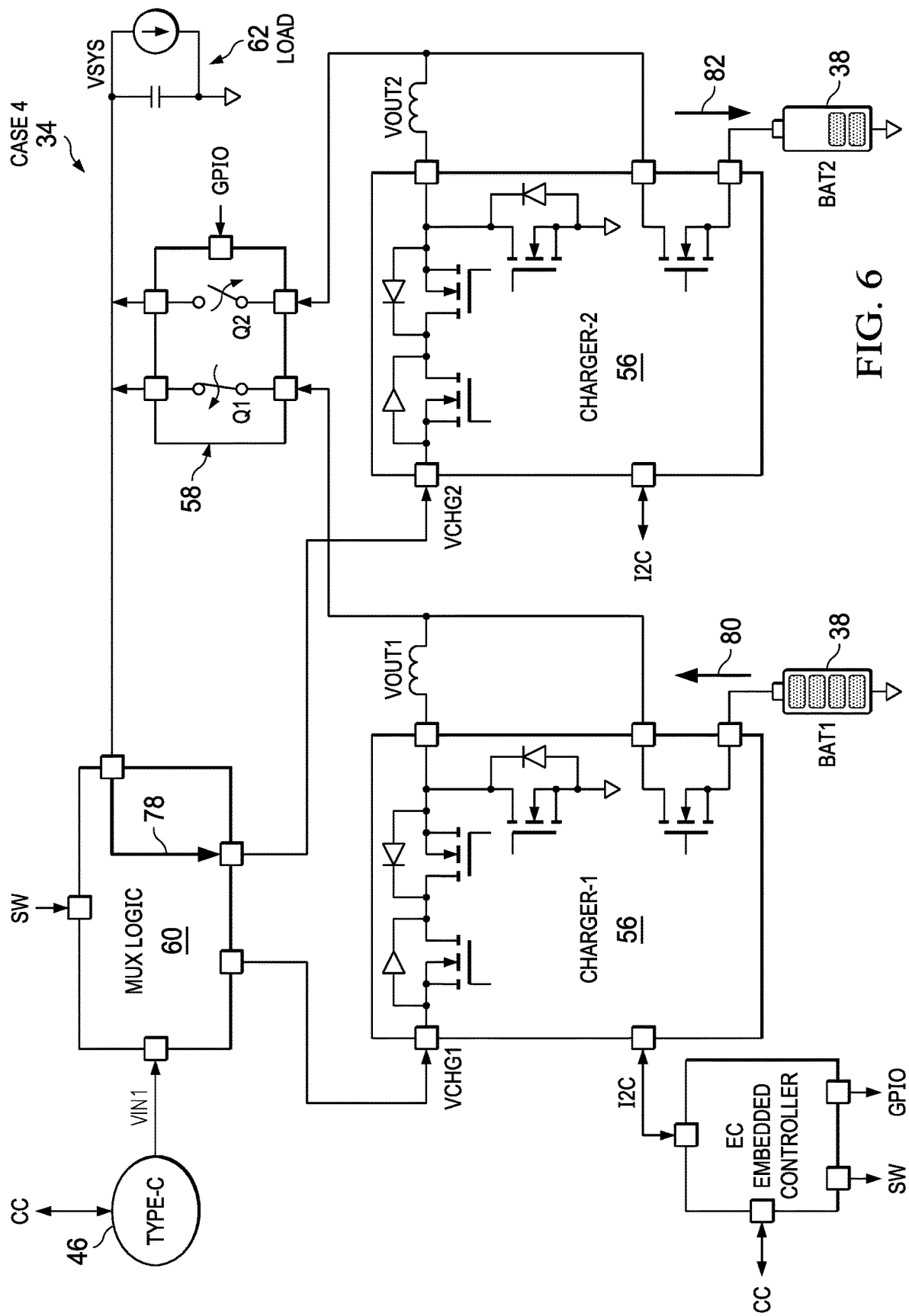
FIG. 6 depicts the circuit block diagram having the chargers configured to balance battery charge between plural batteries without external power provided at the port.
Figure 7:
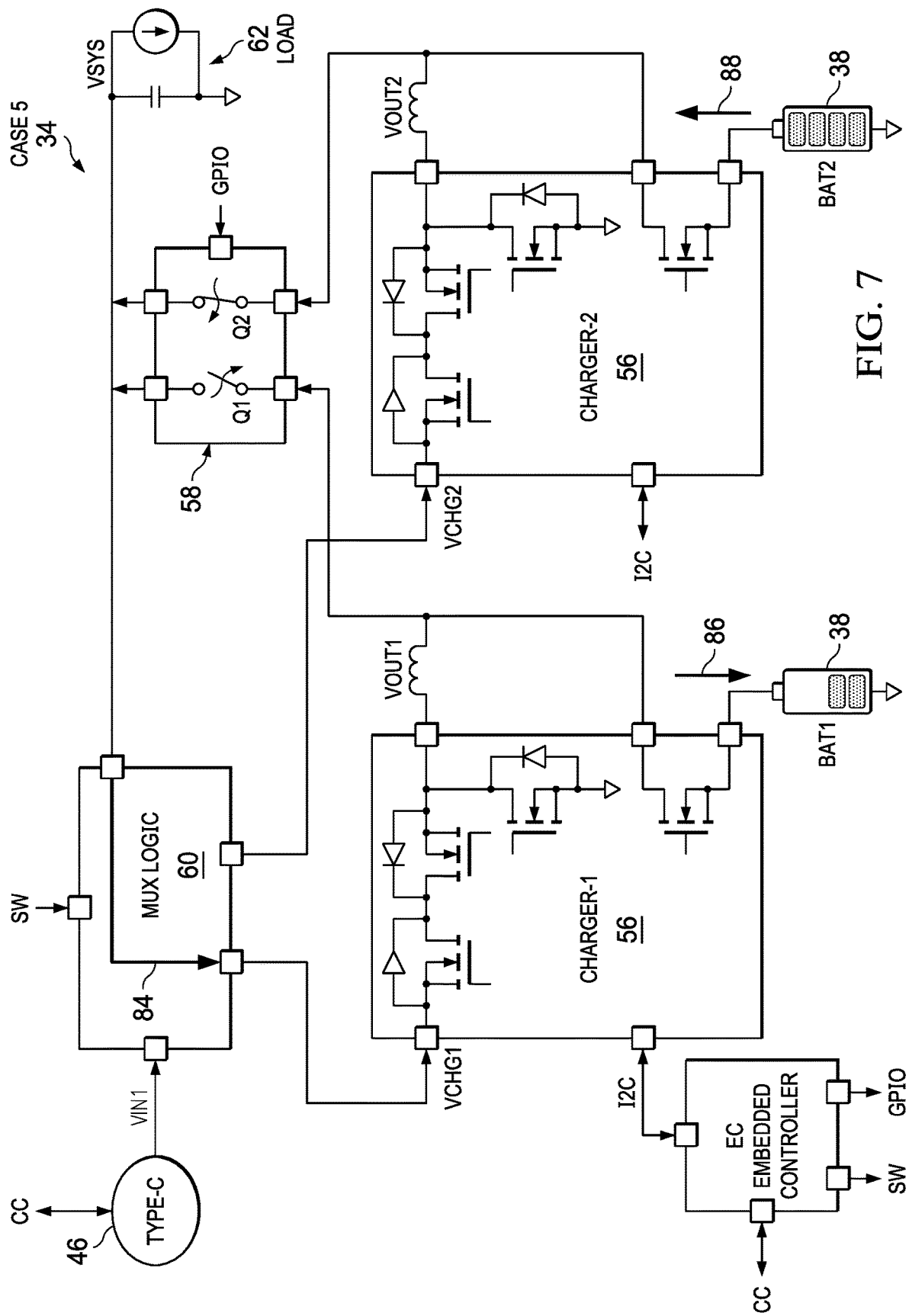
FIG. 7 depicts the circuit block diagram having the chargers configured to balance battery charge between plural batteries without external power provided at the port.

Referring now to FIG. 6, the circuit block diagram depicts the chargers 56 configured to balance battery 38 charge between plural batteries without external power provided at the port 46. As indicated in FIG. 6, Bat1 has a full charge while Bat2 has a depleted charge. In FIG. 7, Bat1 has a full charge while Bat2 has a depleted charge. Battery charge imbalance may take place, for example, where information handling system housing portions that each have a battery 38 are separate to charge or discharge separately from each other. In such an instance, upon recoupling of the housing portions to each other, balancing of battery charge may be desired in the event that the housing portions will be again separated before an external power source is available. In FIG. 6, embedded controller 22 configures switch 60 as indicated by arrow 78 to interface Vchg2 of charger-2 with power rail Vsys, and configures switch 58 to close Q1 and open Q2 so that power provided from Bat1 as indicated by arrow 80 is available through Vchg2 at charger-2 to charger Bat2 as indicated by arrow 82. In FIG. 7, embedded controller 22 configures switch 60 as indicated by arrow 84 to interface Vchg1 of charger-1 with power rail Vsys, and configures switch 58 to close Q2 and open Q1 so that power provided from Bat2 as indicated by arrow 88 is available through Vchg1 at charger-1 to charger Bat1 as indicated by arrow 86. Embedded controller 22 sets the chargers 56 to draw a charging current that minimizes impact on system load, such as based upon context at information handling system 10.

Figure 8:
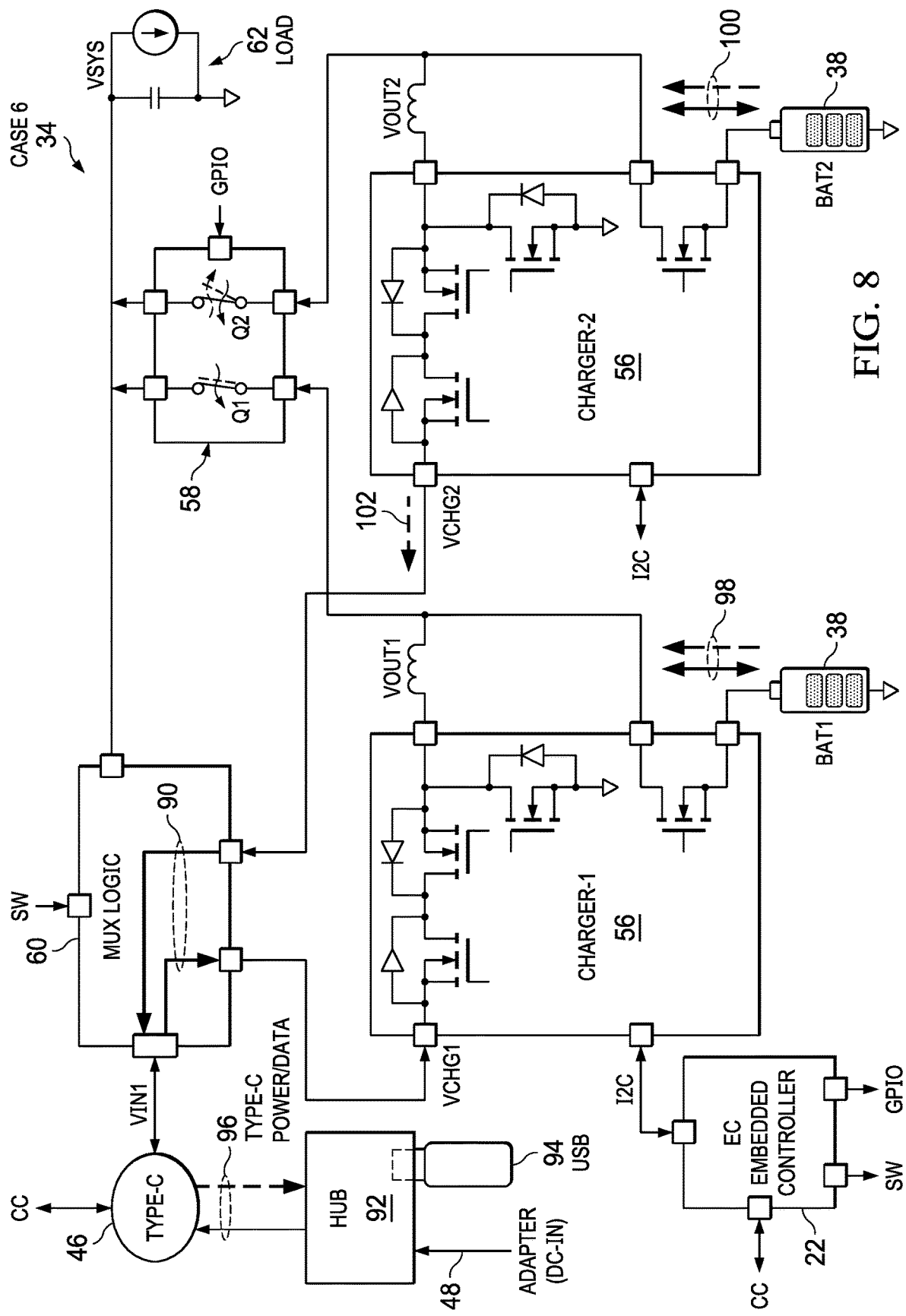
FIG. 8 depicts the circuit block diagram having the chargers configured to support a fast response for supporting transition from supporting a power source to supporting a power sink.
Figure 9:
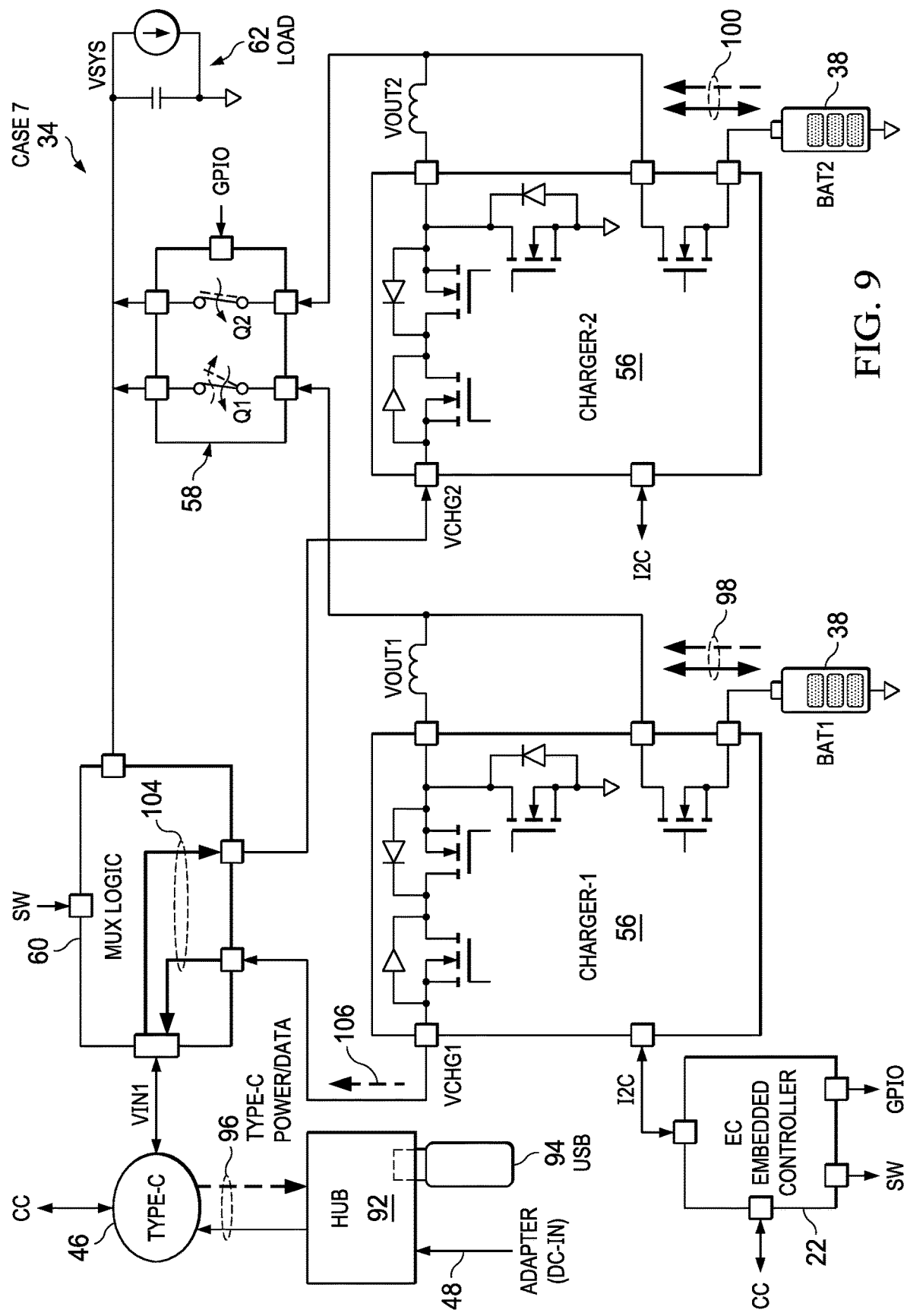
FIG. 9 depicts the circuit block diagram having the chargers configured to support a fast response for supporting transition from supporting a power source to supporting a power sink.

Referring now to FIG. 8, the circuit block diagram depicts the chargers 56 configured to support a fast response for transitioning from accepting power from a power source to providing power to a power sink. In the example embodiment, a hub 92 interfaces with port 46, such as through a USB cable. In alternative embodiments, hub 92 may be included in a portable information handling system housing to support plural ports 46 as depicted by FIG. 1. Hub 92 interfaces with a power source 48, such as an AC/DC adapter, and a power sink USB device 94, such as memory key. Although power source 98 provides power through port 46 to power information handling system 10, in the event that power source 48 disconnects from hub 92, information handling system 10 will have to rapidly transition from receiving power at port 46 to instead provide power to port 46, as indicated by arrows 96. To achieve a fast power transition, embedded controller 22 configures chargers 56 so that one charger 56 receives power and the other charger 56 sends power as indicated by arrow 102. At a transition from having a power source at port 46 to having a power sink, embedded controller 22 activates switch 60 so that the appropriate charger 56 interfaces with port 46, as indicated by arrows 90. In the example embodiment of FIG. 9, charger-1 is configured to accept power from port 46 and charger-2 is configured to send power to port 46. In the example embodiment of FIG. 9, charger-1 is configured to send power to port 46 and charger-2 is configured to receive power from port 46. While a power source is interfaced with port 46, embedded controller 22 closes both Q1 and Q2 in switch 58 so that batteries 38 interface with power rail Vsys as indicated by arrows 98 and 100. In FIG. 8, charger-2 may be configured to accept charge from power rail Vsys to charge Bat2 based upon the power configuration established by embedded controller 22. In FIG. 9, charger-1 may be configured to accept charge from power rail Vsys to charge Bat1 based upon the power configuration established by embedded controller 22.

During operation with a power source interfaced to port 46, switch 60 interfaces Vin from port 46 with the charger 56 configured to accept power. Detection of loss of the power source at port 46 may be performed by the charger receiving power and reported to embedded controller 22 or may be performed by embedded controller 22 loss of control communication at the CC interface. Once loss of the power source is detected at port 46, embedded controller 22 commands switch 60 to disconnect the charger configured to accept power and to connect the charger configured to send power to port 46. In one embodiment, charger 56 that sends power is preconfigured to provide power based upon the power characteristics provided from the power sinks interfaced with port 46, such as by coordination through embedded controller 22. Thus as soon as switch 60 interfaces the charger 56 that provides power to port 46, the power sink at hub 92 receives power from information handling system 10. Simultaneously with the change commanded at switch 60, embedded controller 22 commands switch 58 to interface one battery 38 with power rail Vsys while disconnecting the other battery 38 so that it powers port 46. For example, in FIG. 8 Q1 remains closed while Q2 opens so that Bat2 provides power through charger-2 to port 46 without discharging to power rail Vsys. In FIG. 9, Q2 remains closed while Q1 opens so that Bat1 provides power through charger-1 to port 46 without discharge to power rail Vsys. In one example embodiment, the battery having the lowest charge state is selected to send power to port 46 while the battery with the highest charge state sends power to power rail Vsys. If the power source is detected again at hub 92, embedded controller 22 reconfigures switches 58 and 60 to again accept external power and hold a charger 56 on standby preconfigured in the event another fast power transition takes place at detection of loss of the power source.

Figure 10:
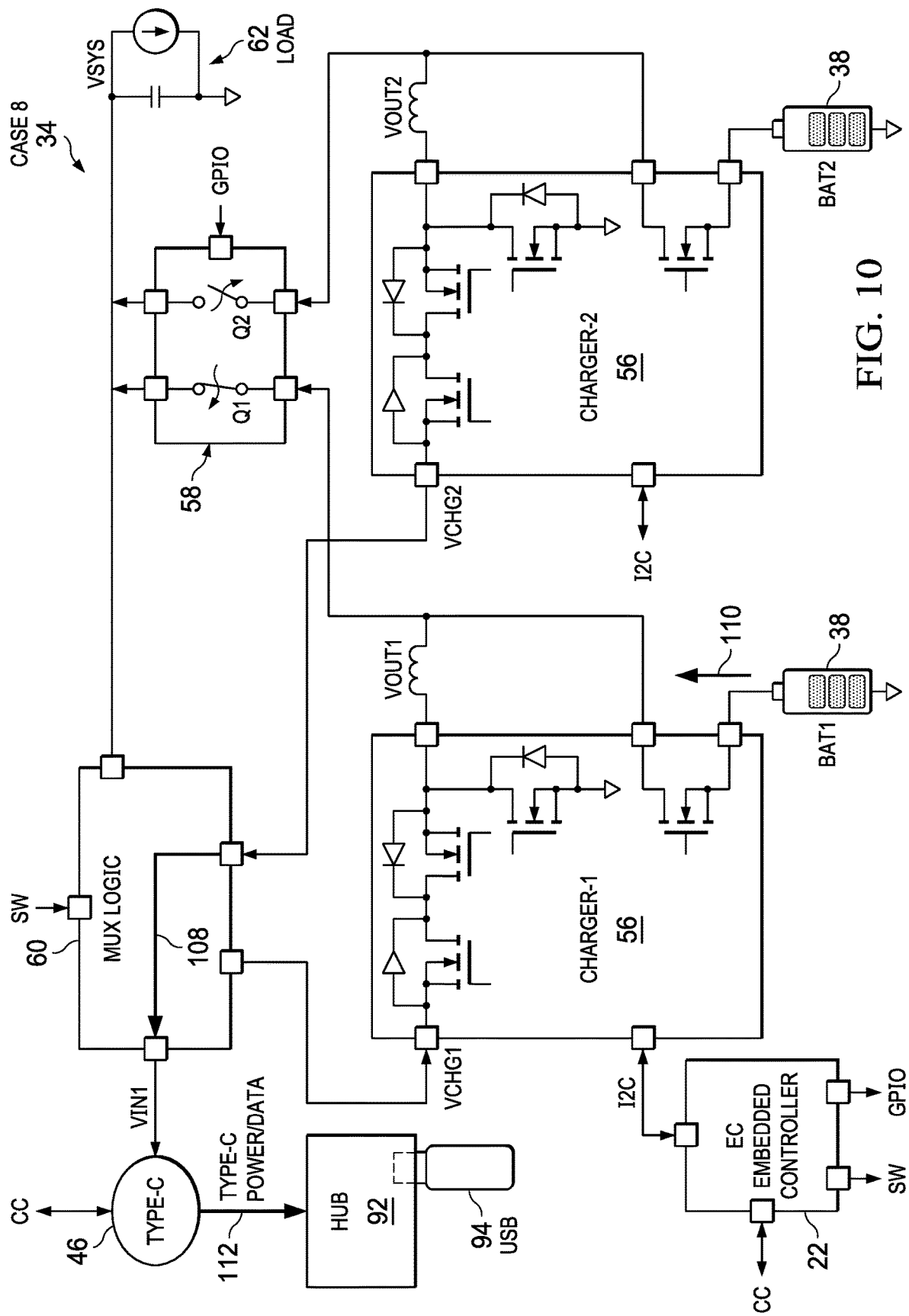
FIG. 10 depicts the circuit block diagram having the chargers configured to support a power sink at the port.
Figure 11:
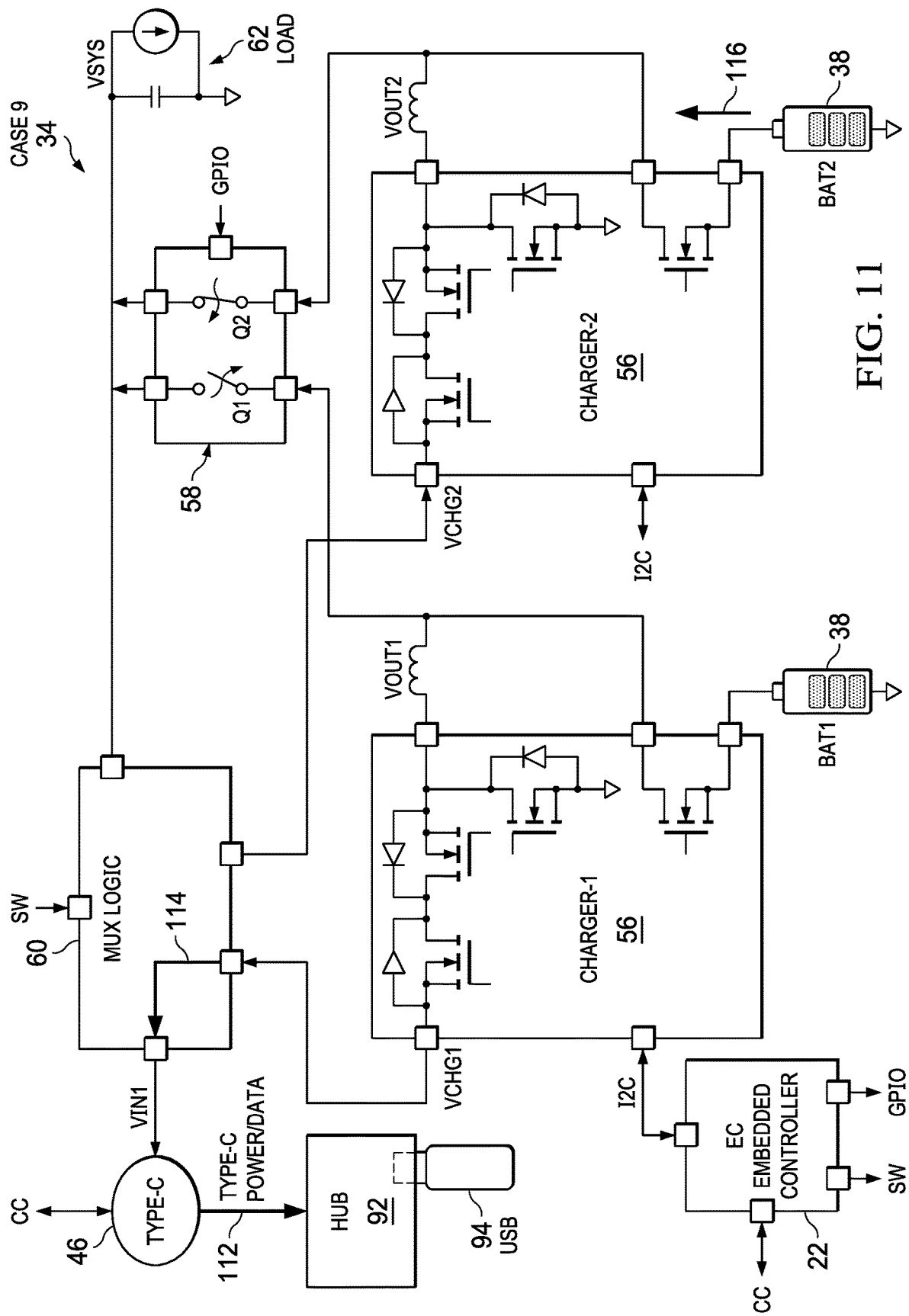
FIG. 11 depicts the circuit block diagram having the chargers configured to support a power sink at the port.

Referring now to FIGS. 10 and 11, the circuit block diagram depicts the chargers 56 configured to support a power sink at the port 46. For example, the configuration of switches 58 and 60 depict power management after a fast response to loss of a power source as shown in FIGS. 8 and 9. In FIG. 10, charger-2 interfaces through switch 60 to provide power to port 46 from Bat2 to power sink 94 while switch 58 opens Q2 to disconnect Bat2 from power rail Vsys. Without the external power source, charger-1 discharges Bat1 as indicated by arrow 110 to provide power to power rail Vsys. In FIG. 11, charger-1 interfaces through switch 60 to provide power to port 46 from Bat1 to power sink 94 while switch 58 opens Q1 to disconnect Bat1 from power rail Vsys. Without the external power source, charger-2 discharges Bat2 as indicated by arrow 116 to provide power to power rail Vsys. In one embodiment, as a battery 38 loses charge powering the system load through power rail Vsys, embedded controller 22 monitors battery 38 charge balance so that a change may be commanded to have the battery 38 with the greatest charge state reconfigured through switch 58 to power the system load.

Figure 12:
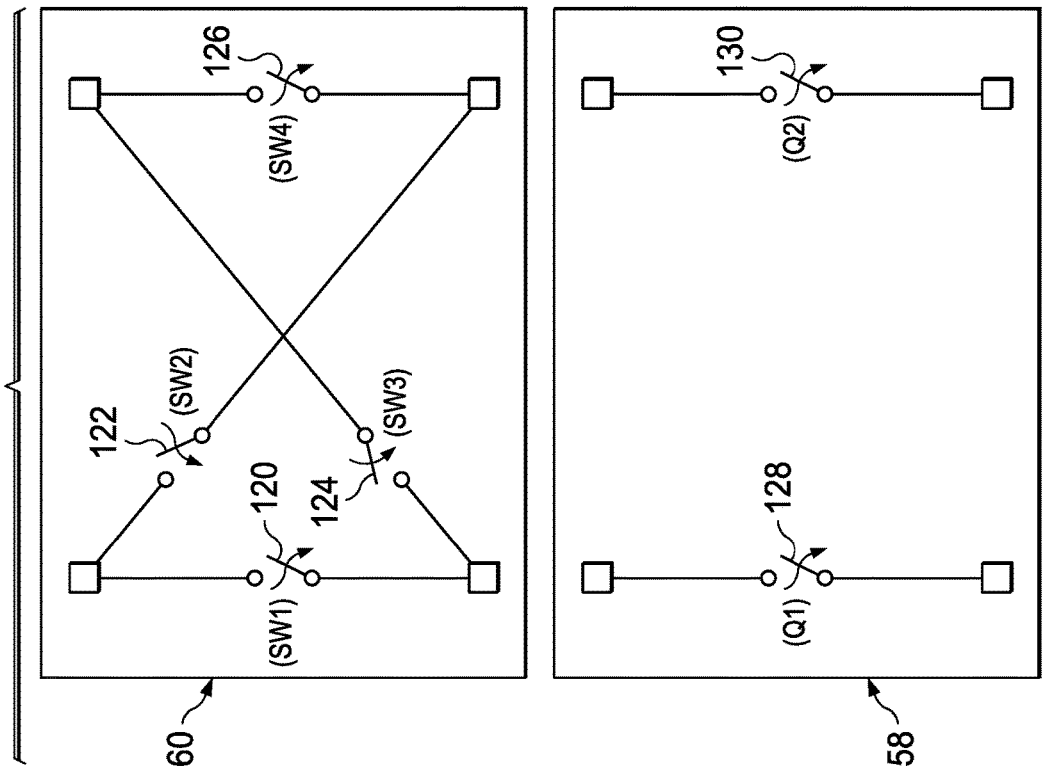
FIG. 12 depicts a multiplexer control logic and state table.

Referring now to FIG. 12 a multiplexer control logic and state table 118 is depicted to support fast response transition between a power source and sink at a port. Multiplexer 60 is depicted as four switches 120-126 that represent the power transfer configurations provided with different logic states, and switch 58 is depicted as switches 128 and 130 that represent Q1 and Q2 for interfacing batteries 38. Case 0, shown in FIG. 1 is commanded with logic at multiplexer 60 that opens all of switches 120-126, and with logic at switch 58 that closes both of switches 128 and 130. Continuing down the logic table, various configurations share multiplexer 60 logic states and switch 58 logic states to achieve the power management presented in FIGS. 2 through 11, which are identified as cases 0 through 9. For example, case 9 (FIG. 11), case 6 at initialization (FIG. 8) and case 7 after fast response (FIG. 9) each close switch 120 of multiplexer 60 and leave switches 122-126 open. Case 8 (FIG. 10), case 6 after fast response (FIG. 8) and case 7 at initialization (FIG. 9) each close switch 122 of multiplexer 60 and leave switches 120 and 124-126 open. Case 5 (FIG. 7) opens switch 124 and closes switches 120-122 and 126. Case 4 (FIG. 6) closes switch 126 and opens switches 120-124. Case 1 (FIG. 3), case 2 (FIG. 4) and case 3 (FIG. 5) each close switches 120-122 and open switches 124-126. The logic state of switch 58 closes switch 130 for cases 3, 5, 7 (after fast response) and 9 while opening switch 128; closes switch 128 for cases 2, 4, 6 (after fast response) and 8, while opening switch 130; and closes both switch 128 and 130 for cases 0, 1, 6 (initial) and 7 (initial). In various embodiments, other types of switch configurations may be used, such as a single multiplexer that also controls batteries 38, or individual switches for each function.

Figure 13:
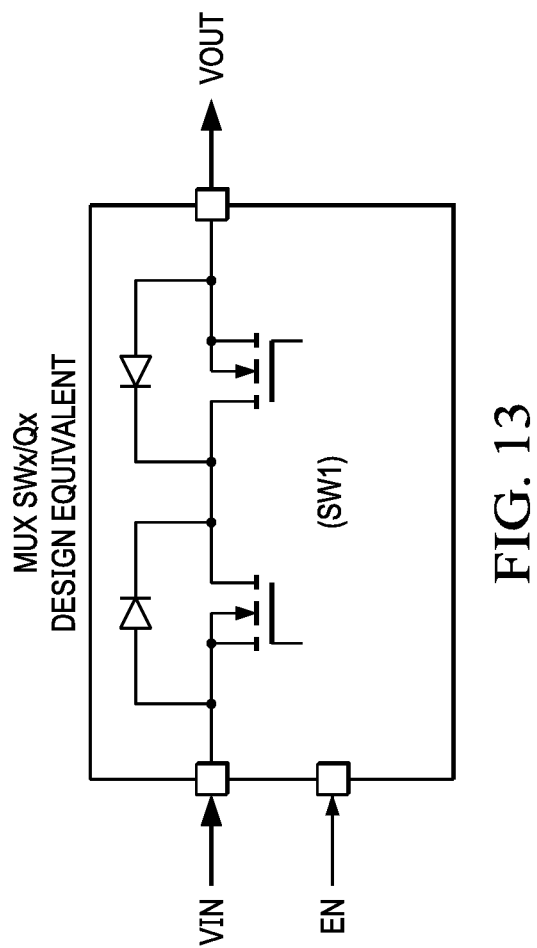
FIG. 13 depicts a circuit diagram of a multiplexer circuit design equivalent.

Referring now to FIG. 13, a circuit diagram depicts a multiplexer circuit design equivalent. For example, to achieve a rapid fast response for power transitions, a dedicated integrated circuit that includes switch logic may enable power management based upon detected power ability or a control signal by a separate controller. Condensing power management logic into an application specific integrated circuit may have a greater up front development and manufacture cost, however, will provide a more rapid power transition response that reduces analog circuit costs for handling power surges and droops.

Figure 14:
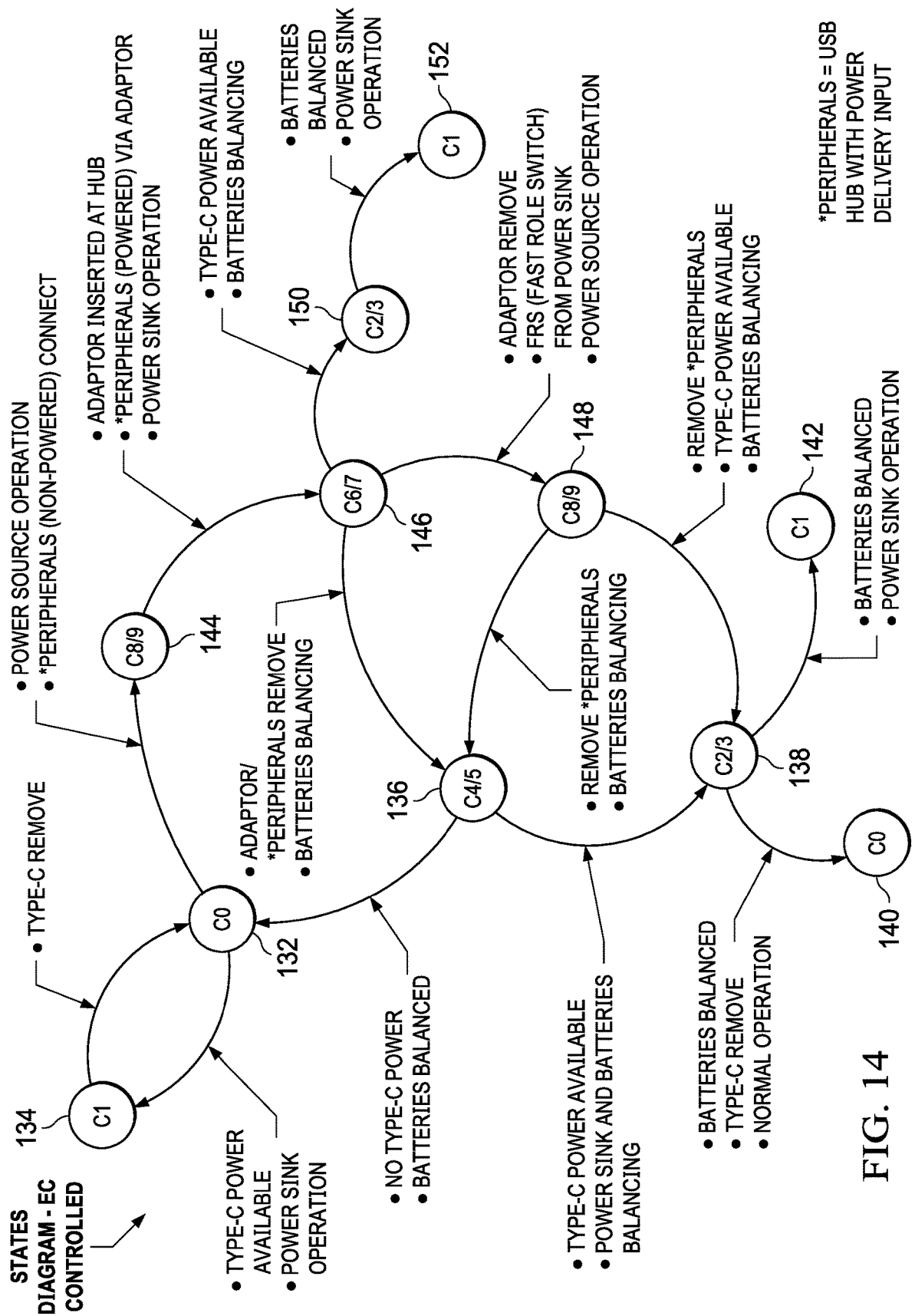
FIG. 14 depicts a state diagram of power management for plural chargers and plural batteries to support fast response transition between a power source and sink at a port.

Referring now to FIG. 14, a state diagram depicts power management for plural chargers and plural batteries to support fast response transition between a power source and sink at a port. By explanation, the state diagram starts at state 132 configured as case 0 with no external power at port 46 and both batteries configured to discharge to the power rail. At an interface of a USB Type C power source, the power system configures itself as a power sink at state 134 to accept power with a transition to case 1. If the external power is removed, the power system transitions back to state 132 to case 0. If at state 132 a peripheral interfaces to port 46, the power system transitions to state 144 to act as a power source as depicted by case 8 or case 9. If at state 144 a power source interfaces to the port 46 to provide power, such as an AC/DC adapter interfaced with a hub, the power system transitions to state 146 depicted by cases 6 and 7 as a power sink that accepts power and allows the hub to power the peripheral.

From state 146 three different state transitions may occur. With external power available, the power system may transition to state 150 depicted by FIGS. 2 and 3 to balance battery charge by altering which battery is charged and which battery is prepared to provide a fast response. From state 150 once the batteries are balanced and charged, the power system transitions to state 152 to act as a power sink. If at state 146 the external power source is removed while the power sink remains interfaced, the power system transitions to state 148 with a fast response role switch to a power source operation that powers the external power sink. If instead at state 146 both the power source and power sink are removed from the port, the power system transitions to state 136 to cases 4 or 5 to have battery balancing during battery discharge to support system operation. Similarly, at state 148, if the power sink is removed from the port, the power system transitions to state 136 to battery charge balance. From states 136 and 148, if power sinks are removed and a power source is connected at port 46, the power system transitions to state 138 to case 2 and 3. From state 138 the power system transitions to state 142 to balance battery charge in a power sink operation if the batteries are not fully charged. If at state 138 the external power source is removed, the power system transitions to state 140 with battery charge balance supported during normal battery operations. The above states provide an example of power management operation corresponding to the various power configurations depicted by FIGS. 2 through 11. In various embodiments, other transitions may be supported based upon different operational conditions.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions to process information;
a memory interfaced with the processor and operable to store the instructions and information;
first and second batteries operable to store power;
a port operable to receive power from an external source and to provide power to an external source;
first and second chargers, the first charger operable to control charge and discharge of the first battery, the second charger operable to control charge and discharge of the second battery, each charger further operable to accept power from an external power source through the port, provide power to an external power sink through the port, and to provide power to the processor;
a first switch disposed between the first and second chargers and the port;
a second switch disposed between the first and second chargers and the processor; and
a controller interfaced with the first and second chargers and the first switch;
wherein the controller configures the first charger to accept power from the port, the second charger to provide power to the port, and commands the first switch to selectively interface the first or second charger with the port based upon one or more predetermined conditions; and
wherein the controller commands the second switch to selectively interface the second charger with the processor based upon the one or more predetermined conditions.

2. The information handling system of claim 1 wherein the one or more predetermined conditions comprise an external power source interfaced with the port, the controller interfacing the first charger with the port in response to detection of the external power source.

3. The information handling system of claim 2 wherein the controller interfaces the first and second charger with the processor in response to detection of the external power source.

4. The information handling system of claim 3 wherein the first charger detects the external power sink and communicates detection of the first power sink to the controller.

5. The information handling system of claim 1 wherein the one or more predetermined conditions comprise an external power sink interfaced with the port, the controller interfacing the second charger with the port in response to detection of the external power sink.

6. The information handling system of claim 5 wherein the controller interfaces the first charger with the processor and disconnects the second charger interface with the processor in response to detection of the external power sink.

7. The information handling system of claim 1 further comprising:
a hub interfaced with the port;
wherein the external power source comprises a direct current power source coupled to the hub and the external power sink comprises a peripheral device coupled to the hub.

8. The information handling system of claim 1 wherein the port comprises a USB Type C port.

9. A method for managing information handling system power, the method comprising:
configuring a first charger to accept power from an external power source through a port;
configuring a second charger to provide power to an external sink through the port;
interfacing the first and second chargers with the port through a switch;
selecting with the switch one of the first or second chargers to interface with the port based upon one or more predetermined factors;
interfacing a first battery with the first charger;
interfacing a second battery with the second charger; and
interfacing the first and second batteries through a switch with a power rail that powers processing components of the information handling system.

10. The method of claim 9 wherein the predetermined condition comprises detection of a power source or power sink at the port, the method further comprising:
detecting a power source at the port;
in response to the detecting the power source, interfacing the first charger with the port and disconnecting the second charger from the port.

11. The method of claim 10 further comprising:
in response to detecting the power source, interfacing both the first and second batteries with the power rail.

12. The method of claim 11 further comprising:
charging the first battery with the first charger;
directing power from the first charger to the power rail; and
charging the second battery with the second charger using power drawn from the power rail.

13. The method of claim 9 wherein the predetermined condition comprises detection of a power source or power sink at the port, the method further comprising:
detecting a power sink at the port;
in response to the detecting the power sink, interfacing the second charger with the port and disconnecting the first charger from the port.

14. The method of claim 13 further comprising:
in response to detecting the power source, interfacing the first battery with the power rail and disconnecting the second battery from the power rail.

15. The method of claim 9 further comprising:
detecting the port is empty; and
in response to the detecting, configuring the second charger to accept power and interfacing both the first and second chargers with the port.

16. An information handling system power system comprising:
first and second chargers, each charger operable to accept external power to charge a battery and to provide power to a power rail, each charger further operable to output power to an external device through a port;
a first switch interfaced with the first and second chargers and the port;
a controller interfaced with the first and second chargers and the first switch, the controller storing instructions in non-transitory memory that execute to selectively command the first switch to interface one or both of the chargers with the port based upon one or more predetermined factors;
a first battery interfaced with the first charger;
a second battery interfaced with the second charger; and
a second switch interfaced with the first and second batteries, the controller and the power rail;

wherein the controller instructions selectively command the second switch to interface one or both of the batteries with the power rail based upon the one or more predetermined factors.

17. The information handling system power system of claim 16 wherein the predetermined conditions comprise a connector coupled to the port having bi-directional power transfer available.

\* \* \* \* \*